Patented Aug. 27, 1940

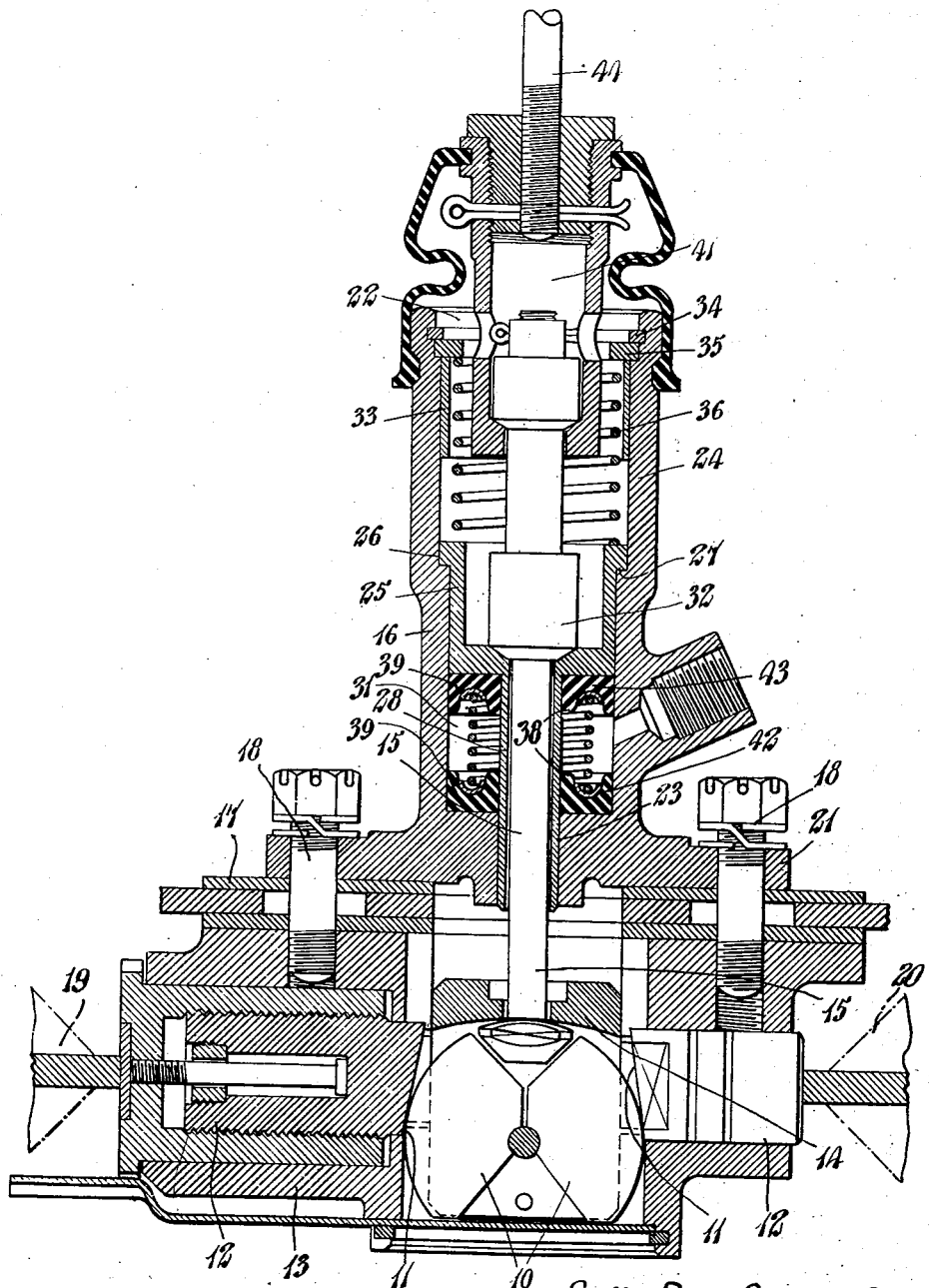

2,212,934

UNITED STATES PATENT OFFICE 2,212,934

BRAKE FOR VEHICLES

Geoffrey Robert Greenbergh Gates, London, England, assignor to Automotive Products Company Limited, London, England Application February 20, 1939, Serial No. 257,551
In Great Britain February 22, 1938

9 Claims. (Cl. 188—106)

This invention relates to brakes for vehicles and it has for its primary object to provide improvements in the actuating means of brakes arranged to be operated alternatively by a hydraulic system and through the medium of a mechanical brake rigging.

In particular the invention sets out to provide an improved arrangement which is simple to construct and which is found in practice to operate efficiently.

A further object of the invention is to provide a compact form of hydraulic cylinder unit adapted to be secured to the outside of a brake assembly, the arrangement being such that the brake can be applied by the hydraulic means without affecting the brake rigging, while the operation of the latter can take place without disturbing the hydraulic part of the actuating device.

A still further object is to provide a form of hydraulic actuating device in which the working space within the cylinder is annular in form and in which the packing means are so arranged as to minimise the sliding friction and consequently lengthen the life of said packing means.

The invention is illustrated in the accompanying drawing, which shows a sectional elevation of the preferred form of hydraulic brake applying mechanism.

The mechanism is illustrated in combination with a brake shoe expanding mechanism according to my patent application Serial No. 205,212 filed April 30, 1938. This comprises sector-shaped members 10 which roll on the inclined surfaces 11 of tappets 12 mounted in a housing 13 between the brake shoe ends and which are carried by a plunger 14. The shoes, the end parts of which are indicated at 19 and 20, are spread apart by moving the plunger through the medium of a tension rod 15, the requisite pull being applied to the rod either hydraulically or mechanically, as described below.

The tension rod 15 extends through a hydraulic cylinder 16 secured to the backplate 17 of the vehicle brake by, for example, studs 18 which pass through a flange 21 on the cylinder, and also serve to secure the housing 13 of the shoe spreading mechanism. The axis of the cylinder 16 is perpendicular to the plane of the backplate 17. The cylinder 16 is open at its outer end 22, and is counterbored at 24 to a slightly greater size than the main bore, whilst it has at its other end a hole 23 of less diameter than the cylinder bore.

Fitting in the main bore of the cylinder 16 is a cup-shaped piston 25, which is shouldered at 26 at its rim to engage the shoulder 27 at the junction of the two cylinder bores, thus limiting the inward movement of the piston. Formed integrally with the piston 25 is a sleeve 28 which extends from the inner end of said piston through the cylinder 16 and into the hole 23 at the inner end thereof, thus providing the inner wall of an annular space 31 within the cylinder. The tension rod 15 passes with clearance through the sleeve 28 and carries a collar 32 against which the piston 25 abuts, so that the outward movement of the piston is transmitted to the rod. A stop sleeve 33 mounted in the counterbore 24 of the cylinder 16 limits the outward movement of the piston 25, and an annular disc 35 which is held in place by a circlip 34 serves as abutment for a spring 36 urging the piston 25 towards its innermost position.

The cylinder space 31 is sealed by two cup washers 42 and 43, the former resting on the end wall of the cylinder 16 and the latter on the annular wall of the piston 25. Each of these cups has an inner lip 38 engaging the piston sleeve and an outer lip 39 engaging the cylinder wall. It will be noted that when the piston moves under the fluid pressure, the cup 42 will move only relatively to the surface (the sleeve 28) on which its inner lip 38 bears, whilst the other cup 43 moves only relatively to the surface (the cylinder 16) on which the outer lip 39 bears. Thus only one lip of each cup moves relatively to the adjacent surface, and this is found to give a low friction at the cups, resulting in long life of these parts.

The tension rod 15 extends towards the open end 22 of the cylinder 16, and is coupled by a lost motion joint 41 to a tension rod 44 of a mechanical brake rigging conveniently actuated by the hand brake lever (not shown) of the vehicle. Thus the rod 15 is free to move when the brakes are applied by fluid pressure, without disturbing the mechanical rigging. Similarly, as the piston 25 merely abuts against the collar 32, a pull applied to the rod 44 by means of the mechanical rigging causes the rod 15 to move through the sleeve 28 of the piston 25 leaving the latter in position. The liquid pressure cylinder is thus not disturbed by the mechanical operation of the brake.

In a preferred arrangement of the invention, pressure liquid is delivered to the cylinder from a foot-pedal operated master cylinder in the manner well-known in liquid pressure vehicle brakes, to exert a pull on the brake rods and apply the brakes. The mechanical linkage is coupled, as mentioned above, to a hand-brake lever, which is used primarily for parking purposes.

What I claim is:

1. In a vehicle brake, an actuating device comprising a hydraulic cylinder having an end wall, a piston slidable in said cylinder, a sleeve secured to the piston and slidable through the end wall of the cylinder, packing means preventing leakage of liquid between the sleeve and the cylinder wall, and between the piston and the cylinder, a tension rod engaging with the piston and extending through said sleeve, and shoe spreading means which are operated by said tension rod.

2. In a vehicle brake, an actuating device comprising a hydraulic cylinder having an end wall, a piston slidable in said cylinder, a sleeve secured to the piston and slidable through the end wall of the cylinder, an annular liquid receptive recess formed by said sleeve and said cylinder, an annular packing cup mounted against the end wall of the cylinder and engaged slidably by the sleeve, and a second annular packing cup mounted upon the sleeve adjacent the piston so as to slide upon the cylinder, a tension rod engaging with the piston and extending through said sleeve, and shoe spreading means which are operated by said tension rod.

3. In a vehicle brake, an actuating device comprising a hydraulic cylinder having an end wall, a piston slidable in said cylinder, an axial sleeve which is formed integrally with the piston and is of such length that it at all times extends slidably through an aperture in the end wall of the cylinder, an annular packing cup mounted against the end wall of the cylinder and engaged slidably by the sleeve, and a second annular packing cup mounted upon the sleeve adjacent the piston so as to slide upon the cylinder, a tension rod engaging with the piston and extending through said sleeve, and shoe spreading means which are operated by said tension rod.

4. In a vehicle brake, an actuating device comprising a hydraulic cylinder having an end wall, a piston slidable in said cylinder, a sleeve formed on said piston and extending slidably through the end wall of the cylinder, an annular liquid receptive recess formed by said sleeve and said cylinder, a tension rod engaging with the piston and extending through said sleeve, shoe spreading means which are operated by said tension rod, and two annular packing cups within the cylinder, said packing cups having inner and outer lips and being of U-shape in radial section, one of said cups being fitted against the end wall of the cylinder so that the inner limb is engaged slidably by the sleeve, while the other cup also surrounds the sleeve and is fitted to the piston so that its outer lip engages slidably with the cylinder, the arrangement being such that the outer lip of the first cup and the inner lip of the second cup are non-slidably engaged with the cylinder and with the sleeve, respectively.

5. In a vehicle brake, an actuating device comprising a hydraulic cylinder having an end wall, a piston slidable in said cylinder, a sleeve formed on the piston and sliding through an aperture in the end wall of the cylinder, packing means operative between the piston and the cylinder and between the sleeve and the end wall of the cylinder, a shoe spreading mechanism, a tension rod serving to operate said mechanism and extending through the sleeve, an abutment on the tension rod bearing against the piston so that movement of said piston by pressure liquid is imparted to the tension rod, and a lost motion connection fitted to said tension rod and adapted to be coupled to a mechanical brake rigging, whereby actuation of the tension rod by the piston leaves the brake rigging unaffected.

6. In a vehicle brake, an actuating device comprising a hydraulic cylinder having an end wall, a piston slidable in said cylinder, an axial sleeve formed upon said piston and sliding through the said end wall, a tension rod coupled mechanically to the piston and extending through the sleeve, a pair of coaxial sliding tappets, and a cam mechanism operatively connected with the tension rod and adapted to spread the tappets apart for applying the brake when the piston moves within the cylinder under the action of liquid pressure.

7. In a vehicle brake, an actuating device according to claim 6, in which the cam mechanism comprises cam surfaces formed upon the inner ends of the tappets, a plunger moved by the tension rod in a direction at right angles to the common axis of the tappets, and a pair of angularly movable sector-shaped members which are individually pivoted to the plunger and roll upon the cam surfaces to move the tappets away from one another.

8. In a vehicle brake, an actuating device comprising a hydraulic cylinder having an end wall, a piston slidable in said cylinder, a sleeve secured to the piston and slidable through the end wall of the cylinder, an annular liquid receptive recess formed between said sleeve and said cylinder, packing means preventing leakage of liquid between the sleeve and the cylinder end wall, and between the piston and the cylinder, a tension rod engaging with the piston and extending through said sleeve, and shoe spreading means which are operated by said tension rod.

9. In a vehicle brake, an actuating device comprising a hydraulic cylinder having an end wall, a piston slidable in said cylinder, a sleeve secured to the piston and slidable through the end wall of the cylinder, an annular liquid receptive recess formed between said sleeve and said cylinder, a tension rod engaging with the piston and extending through said sleeve, and shoe spreading means which are operated by said tension rod.

GEOFFREY ROBERT
GREENBERGH GATES.